Dec. 31, 1929.  H. Y. NORWOOD  1,741,330

THERMOMETER

Filed Jan. 26, 1928

INVENTOR:
Harry Y. Norwood
BY
Alfred Barger,
his ATTORNEY

Patented Dec. 31, 1929

1,741,330

UNITED STATES PATENT OFFICE

HARRY Y. NORWOOD, OF WEST RUSH, NEW YORK, ASSIGNOR TO TAYLOR INSTRUMENT COMPANIES, OF ROCHESTER, NEW YORK, A CORPORATION OF NEW YORK

THERMOMETER

Application filed January 26, 1928. Serial No. 249,575.

This invention relates to thermometers of the type having a colored stripe in the back of the mercury column to make the position of the top of the column more easily visible, i. e. to facilitate the reading of the thermometer.

Heretofore, it was found difficult to obtain a suitable color contrast, principally for the reason that is was difficult, if not practically impossible to obtain a sufficient depth of color or chroma of a desired hue and color value.

In the manufacture of glass tubing embodying lens fronts and colored stripes, it has been found desirable to dimension and position the stripes so as to assume in the finished product a visual width equal to that of the bore and the column of mercury therein. According to the usual practice, a mass of molten glass is gathered on a blow pipe and after air is blown into it, the mass of glass is shaped by turning the pipe and by rolling of the body of glass on a plane surface to give it a circular cross-section and to symmetrically dispose the air bubble. Then an enamel of the desired color, say red, in the form of a narrow layer of plastic material, is laid upon the mass of glass, whereupon some more clear glass is gathered around it. In some instances a layer of white enamel is superposed upon the colored enamel to extend to both sides thereof, before the additional clear glass is gathered around it. In any case, the layer of colored enamel has a tendency to flow or spread laterally and thereby decrease in thickness. In fact, the enamel is usually applied by a spatula or the like so that the depth of the layer is bound to be small. As the result of this inherent limitation as to depth of the layer, the color in the finished article usually appears light and faded.

My invention has for its object to provide a method of making glass tubing whereby it is possible to give the colored stripe a richer or deeper chroma than was heretofore possible.

For a full explanation of the invention and its practical significance, reference is made to the accompanying drawings, wherein.

My invention, briefly expressed, consists in applying to the body of glass, after the latter has been rolled as above described, two relatively heavy layers of enamel or the like separated from each other by a narrow gap and then filling a colored enamel into the gap to fill it up.

Having reference to the drawings, 1 represents a blow pipe and 2 a mass of glass thereon. A templet 3 is placed upon the glass to cover a surface portion thereof. Then a suitable enamel 4, preferably white enamel, is applied on both sides of the templet so as to form relatively thick layers, preferably increasing in thickness from the outside toward the templet. In this manner I am able to form a heavy or thick layer with a relatively deep groove in the center. After the white enamel is applied, I remove the templet 3 and fill the groove or gap left with the colored enamel 5. The colored enamel can be quickly applied before the white enamel can flow. The white enamel thus holds the colored enamel in place and prevents it from flowing laterally or from materially decreasing in depth. I have found that by applying a red stripe of a certain hue and color value, I obtain a much more intensive depth of color or chroma than was possible with the usual methods.

Figure 1:
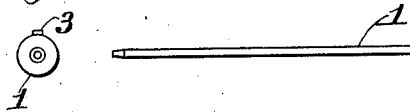
Fig. 1 is an elevation of apparatus suitable for carrying out the object of the invention.
Figure 2:
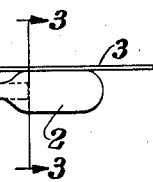
Fig. 2 is an end view thereof.
Figure 3:
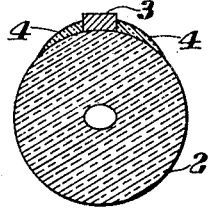
Fig. 3 is an enlarged cross-section taken on line 3—3, Fig. 1.
Figure 4:
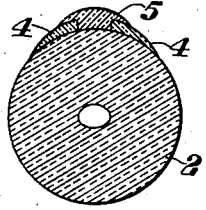
Fig. 4 is a similar cross-section showing a subsequent stage in the execution of the invention.
Figure 5:
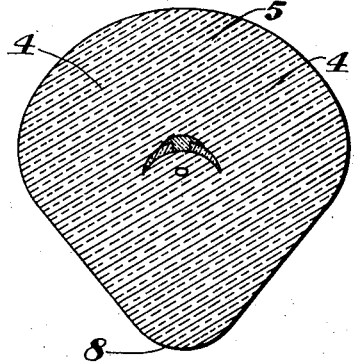
Fig. 5 is an enlarged cross-section of the finished tubing.

After the colored enamel 5 has been applied, a fresh charge of clear glass is gathered about the body of glass 2 whereupon the same is subjected to a lensing operation which determines the final shape of the glass for drawing, as indicated in Fig. 5 wherein the curved surface 8 denotes the lens surface in the finished cane.

By the method described, it is made possible to provide a layer of enamel of much greater thickness than was possible with the old methods and the chroma of the colored enamel, due to the increased thickness of the layer, is correspondingly deeper and richer.

I claim:

1. In a process of making glass tubing having a colored stripe back of the bore, the steps which consist in covering a surface portion of a ball of glass while in plastic condition, depositing vitreous material on both sides of and up to the covered portion to form two layers, then uncovering said covered portion and filling the uncovered portion with a colored vitreous material.

2. In a process of making glass tubing having a colored stripe back of the bore, the steps which consist in covering a surface portion of a ball of glass while in plastic condition, depositing vitreous material on both sides of the covered portion to form layers increasing in thickness toward the covered portion, then uncovering the covered portion and filling the space left between the layers with a colored vitreous material.

In testimony whereof I affix my signature.

HARRY Y. NORWOOD.